United States Patent
Daly et al.

(10) Patent No.: US 11,779,899 B2
(45) Date of Patent: Oct. 10, 2023

(54) REACTOR FOR POLYMERIZATION PROCESSES

(71) Applicant: ExxonMobil Chemical Patents Inc., Baytown, TX (US)

(72) Inventors: Kevin B. Daly, Jersey City, NJ (US); Jerard T. Smith, League City, TX (US); Vetkav R. Eswaran, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 286 days.

(21) Appl. No.: 17/067,319

(22) Filed: Oct. 9, 2020

(65) Prior Publication Data

US 2021/0121847 A1 Apr. 29, 2021

Related U.S. Application Data

(60) Provisional application No. 62/927,399, filed on Oct. 29, 2019.

(51) Int. Cl.
| | | |
|---|---|---|
| *B01J 19/06* | (2006.01) | |
| *B01J 19/00* | (2006.01) | |
| *B01J 19/32* | (2006.01) | |
| *C08F 2/01* | (2006.01) | |

(52) U.S. Cl.
CPC ............ *B01J 19/32* (2013.01); *B01J 19/006* (2013.01); *B01J 19/0013* (2013.01); *B01J 19/06* (2013.01);
(Continued)

(58) Field of Classification Search
CPC ............... C08F 2/01; B01J 2219/00083; B01J 2219/00763; B01J 2219/32206;
(Continued)

(56) References Cited

U.S. PATENT DOCUMENTS

| | | | |
|---|---|---|---|
| 5,256,732 A | 10/1993 | Morita et al. | |
| 5,726,258 A * | 3/1998 | Fischer | B01J 19/242 526/64 |

(Continued)

FOREIGN PATENT DOCUMENTS

| | | | | |
|---|---|---|---|---|
| CN | 102917779 A * | 2/2013 | | B01F 15/00 |
| EP | 0 087 817 A1 | 9/1983 | | |
| GB | 1 569 518 A | 6/1980 | | |
| WO | 2019/156802 A1 | 8/2019 | | |

OTHER PUBLICATIONS

CN_102917779 A—machine translation (Year: 2023).*
(Continued)

*Primary Examiner* — Huy Tram Nguyen

(57) ABSTRACT

In at least one embodiment, a reactor includes a reactor body. A first internal heat exchanger and a second internal heat exchanger are within the reactor body. One or more slabs of one or more static inserts are disposed between the first internal heat exchanger and the second internal heat exchanger. A plurality of flow paths is defined between the plurality of flow channels of the first internal heat exchanger and the plurality of flow channels of the second internal heat exchanger. Each static insert is configured to rotate or translate a flow path so that on average, the existing boundary layers formed in the first heat exchanger are moved away from the channel walls by a distance of equal or greater than the thickness of the boundary layers at the exit of the first heat exchanger.

24 Claims, 9 Drawing Sheets

(52) U.S. Cl.
CPC ....... *C08F 2/01* (2013.01); *B01J 2219/00083* (2013.01); *B01J 2219/00763* (2013.01); *B01J 2219/32206* (2013.01)

(58) Field of Classification Search
CPC ............ B01J 2208/00831; B01J 8/0496; B01J 8/1836; B01J 19/24; B01J 2208/00141; B01J 2208/00203; B01J 2208/00849; B01J 2219/00772; B01J 19/32; B01J 19/0013; B01J 19/006; B01J 19/06
USPC ........................................................ 526/348
See application file for complete search history.

(56) References Cited

U.S. PATENT DOCUMENTS

| | | |
|---|---|---|
| 9,708,428 B2 * | 7/2017 | Reimers .................... C08F 2/04 |
| 10,544,246 B2 | 1/2020 | Jiang et al. |
| 2017/0088647 A1 | 3/2017 | Reimers et al. |
| 2019/0247821 A1 | 8/2019 | Eswaran et al. |
| 2020/0147576 A1 | 5/2020 | Van Geem et al. |

OTHER PUBLICATIONS

Nickolay, Markus et al., Improved approximation for the Nusselt number for hydrodynamically developed laminar flow between parallel plates, International Journal of Heat and Mass Transfer (2002) 45, 3263-3266.
Eswaran et al., U.S. Appl. No. 62/927,416, filed Oct. 29, 2019.

* cited by examiner

11,779,899 B2

REACTOR FOR POLYMERIZATION PROCESSES

CROSS-REFERENCE TO RELATED APPLICATIONS

This application claims the priority benefit of U.S. Ser. No. 62/927,399, filed Oct. 29, 2019, the disclosure of which is incorporated herein by reference.

FIELD

The present disclosure relates to polymerization reactors and polymerization processes utilizing an internal heat exchanger, such as a spiral heat exchanger.

BACKGROUND

Unsaturated monomers, particularly olefin monomers, are polymerized in a variety of polymerization processes using a wide variety of catalysts and catalyst systems. A common polymerization process used in the production of olefin based polymers such as polyethylene or polypropylene homopolymers, as well as copolymers, is a liquid phase based process, such as in a solution process or in a slurry process.

In a solution process, the formed polymer is dissolved in the polymerization medium. Often, the catalyst and monomer are also completely dissolved in the polymerization medium, but that is not a requirement of a solution process. In a typical solution process, the polymerization temperature may be at, above or below the melting point of the dry polymer. For example, in typical solution phase polyethylene processes, polymerization can be conducted in a hydrocarbon solvent at temperatures above the melting point of the polymer and the polymer is typically recovered by vaporization of the solvent and any unreacted monomer. In some cases solvents or diluents are used, while in others the monomer to be polymerized also acts as the solvent (e.g. a bulk polymerization process). In each of these solution systems, there remain factors that influence not only the rate at which the polymerization can run, but can also influence the microstructure and properties of polymer produced. In a typical solution process, the polymer formed is dissolved in the solvent. The higher the concentration of the polymer results in a higher viscosity of the polymerization reaction mixture containing polymer, monomers and solvent. The maximum polymer concentration that can be handled is limited by the viscosity of the solution. A higher viscosity results in poorer heat transfer and a higher power requirement for pumping—all of which determine the technical and economic feasibility. This is especially of concern when producing polymers with high molecular weight.

Liquid phase polymerization may be performed in a variety of reactors to manufacture a variety of polymers, such as olefin based polymers and copolymers, such as polyethylene and polypropylene copolymers. A continuous flow stirred tank reactor (CFSTR) is one example of a reactor that may be used to carry out the liquid phase polymerization. A tubular reactor (TR) is another example of a reactor that may be used to conduct liquid phase polymerization. One setback of a liquid phase polymerization process performed in TRs is that the mixing is poorer than in a CFSTR, which results in non-uniform reaction temperature and concentration of monomer and/or catalyst, which then affect the uniformity of the properties of the polymer produced.

FIG. 1 is a schematic illustration of a side cross-sectional view of a vertically oriented reactor 2 configured to perform a liquid phase polymerization process. The reactor includes an inlet 8 and an outlet 9 and includes a first internal heat exchanger 3 and a second internal heat exchanger 5 between the inlet 8 and the outlet 9. The inlet 8 introduces a stream upward through a plurality of flow channels 4 of the first internal heat exchanger 3, through a plurality of flow channels 6 of the second internal heat exchanger 5, and through the outlet 9. The flow paths of the stream through the first internal heat exchanger 3 to the second internal heat exchanger 5 remain primarily the same. For example, a flow path 1 exiting a flow channel 4 of the first internal heat exchanger 3 primarily flows into a flow channel of the second internal heat exchanger 5. As the flow paths enter the first internal heat exchanger 3, they form thermal boundary layers at the chilled or heated channel walls. These boundary layers grow in thickness along the length of the flow paths until they exit heat exchanger 3 or reach a fully developed thickness determined by the channel geometry, fluid velocity, and fluid physical properties. For example, in laminar flow through planar channels with a fixed wall temperature, the fully-developed thickness is 0.265 multiplied by the width of the channel. If the flow paths continue unobstructed across the gap between heat exchangers 3 and 5, their boundary layers will tend to propagate into the channels of heat exchanger 5, especially in laminar flow where there is no turbulent, radial mixing. Once inside heat exchanger 5, the boundary layers continue to grow until they exit heat exchanger 5 or reach their fully developed thickness. The thickness of the boundary layer is inversely proportional to the heat transfer coefficient, so as the boundary layers grow, the heat transfer rate decreases. Low heat transfer rates reduce the efficiency of the internal heat exchangers and increases non-uniform reaction temperatures undesirably impacting the uniformity of the properties of the polymers produced. Therefore, there is a need for improved apparatuses and processes for liquid phase polymerization in TRs.

SUMMARY

In at least one embodiment, a reactor includes a reactor body. A first internal heat exchanger and a second internal heat exchanger are within the reactor body. One or more slabs of one or more static inserts are disposed between the first internal heat exchanger and the second internal heat exchanger. Static inserts cause a local twist in flow pattern that is created by the shape of the insert superimposed on the nominal bulk flow overall direction. The local flow pattern is twisted at various angles relative to the bulk flow direction and the extent of the twist is determined by the geometry of the static insert.

In another embodiment, a reactor includes a reactor body. A first internal heat exchanger is within the reactor body. The first internal heat exchanger has a plurality of flow channels. A second internal heat exchanger is within the reactor body. The second internal heat exchanger has a plurality of flow channels. A plurality of flow paths is defined between the plurality of flow channels of the first internal heat exchanger and the plurality of flow channels of the second internal heat exchanger. One or more slabs of a plurality of static inserts are disposed between the first internal heat exchanger and the second internal heat exchanger. The plurality of static inserts is configured to rotate or translate the plurality of flow paths so that on average the existing boundary layers formed in heat exchanger are separated from the channel walls by a distance of δ or greater when the flow paths enter heat exchanger. This transformation of the flow paths by the static inserts exposes hot fluid to the chilled walls (or vice versa), creating larger temperature gradients at the walls and therefore larger heat transfer coefficients. The transformation also delays the growth of boundary layers formed in heat exchanger because they are no longer in contact with the wall.

In an embodiment, a polymerization process for forming polymer includes flowing a stream comprising a monomer and a catalyst through a first internal heat exchanger in a reactor. The stream is rotated by flowing the stream through one or more slabs of one or more static inserts in the reactor. The stream is flowed through a second internal heat exchanger in the reactor.

BRIEF DESCRIPTION OF THE DRAWINGS

So that the manner in which the above recited features of the present disclosure can be understood in detail, a more particular description of the disclosure briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

Figure 1:
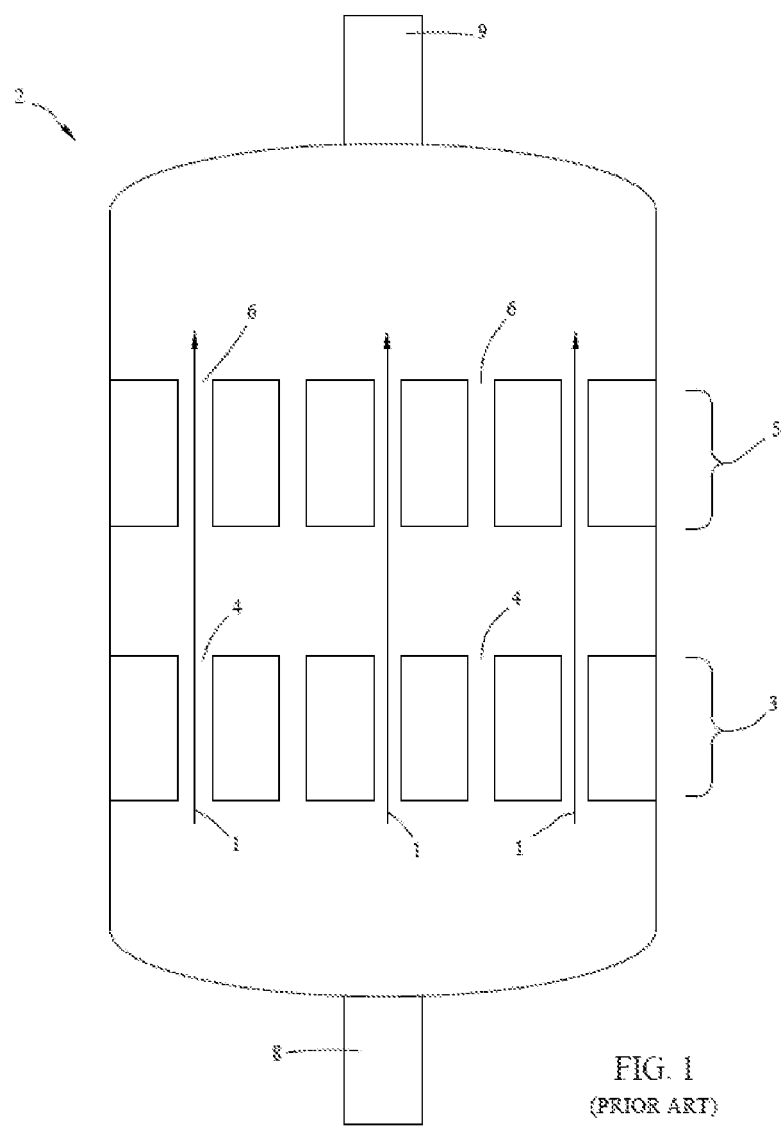
FIG. 1 is a schematic illustration of a side cross-sectional view of a vertically oriented reactor.

To facilitate understanding, identical reference numerals have been used, where possible, to designate identical elements that are common to the figures. It is contemplated that elements disclosed in at least one embodiment may be beneficially utilized on other embodiments without specific recitation.

DETAILED DESCRIPTION

Embodiments will now be described in greater detail below, including specific embodiments, versions and examples, but the embodiments are not limited to these embodiments, versions or examples, which are included to enable a person having ordinary skill in the art to make and use the embodiments, when the information in this patent is combined with available information and technology.

Various terms as used herein are defined below. To the extent a term used in a claim is not defined below, it should be given the broadest definition persons in the pertinent art have given that term as reflected in one or more printed publications or issued patents.

A "reaction zone," also referred to as a "polymerization zone," means a container where polymerization takes place, for example, a batch reactor or continuous reactor. When multiple reactors are used in either series or parallel configuration, each reactor may be considered as a separate reaction zone or a separate polymerization zone. Alternatively, a reactor may include one or more reaction zones or polymerization zones. For a multi-stage polymerization in both a batch reactor and a continuous reactor, each polymerization stage is considered as a separate polymerization zone.

A "continuous process" means a process to produce a polymer in which the product is continuously withdrawn and fresh feed is continuously introduced. A continuous process can be contrasted to a batch process.

A "batch process" means a process to produce a polymer in which a fixed mass of reactants and solvents are introduced into the reactor. The reaction is allowed to proceed to desired level of completion, and the products and residual reactants and solvents are withdrawn from the reactor for further purification. A batch process can be contrasted to a continuous process.

A "solution polymerization" means a polymerization process in which the polymer is dissolved in a liquid polymerization medium, such as an inert solvent or monomer(s) or their blends.

A "bulk polymerization" means a polymerization process in which the monomers and/or comonomers being polymerized are used as a solvent or diluent using little or no inert solvent as a liquid or diluent. A small fraction of inert solvent might be used as a carrier for a catalyst and a scavenger. A bulk polymerization system contains less than 25 wt % of inert solvent or diluent, such as less than 10 wt %, such as less than 1 wt %, preferably 0 wt %.

A "slurry polymerization" means a polymerization process where at least 95 wt % of polymer products produced are in granular form as solid particles not dissolved in the diluent.

In some embodiments, a liquid-phase polymerization process is conducted in a reactor by flowing a stream, such as a feed stream and/or a recirculating stream, through a first internal heat exchanger, through one or more static inserts, and through a second internal heat exchanger. The stream includes a solvent optionally with or without monomer(s) and optionally with or without a catalyst. In the case in which the stream includes monomer(s) and a catalyst, the stream may include a reaction product as the stream flows through the first internal heat exchanger, through the static insert(s), and/or through the second internal heat exchanger. The static inserts are disposed at outlets of a plurality of flow channels of the first internal heat exchanger. The static inserts produce rotation in the flow paths of the stream and prevent the streams to flow directly from outlets of the flow channels of the first internal heat exchanger to inlets of the flow channels of the second internal heat exchanger. In some embodiments, a solution polymerization process is conducted by flowing a stream comprising a solvent, a monomer (without or without comonomer(s)), and a catalyst causing an exothermic reaction in the reactor. In some embodiments, without being bound by theory, it is believed that at least a portion of the monomer is polymerized in between the first internal heat exchanger and the second internal heat exchanger to produce a polymer product. By rotating the flow paths between the first internal heat exchanger and the second internal heat exchanger, temperature variations of the flow paths between the first internal heat exchanger and the second internal heat exchanger are reduced in some embodiments. In some embodiments, at least a portion of the monomer is polymerized within the second internal heat exchanger to produce a polymer product. By rotating the flow paths between the first internal heat exchanger and the second internal heat exchanger, temperature variations of the flow paths within the second internal heat exchanger are reduced in some embodiments.

Figure 2:
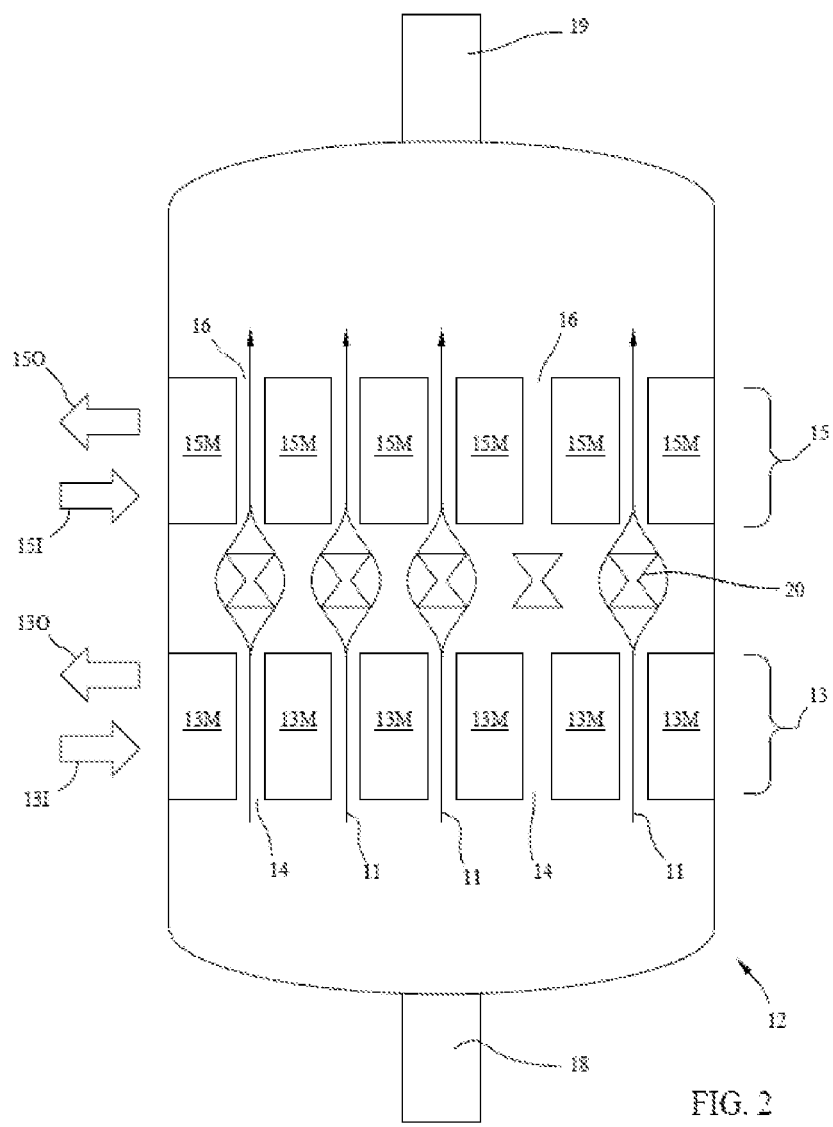
FIG. 2 is a schematic illustration of some embodiments of a side cross-sectional view of a reactor including one or more static inserts.

FIG. 2 is a schematic illustration of some embodiments of a side cross-sectional view of a reactor 12 including one or more static inserts 20. The reactor 12 includes an inlet 18 and an outlet 19 and includes a first internal heat exchanger 13 and a second internal heat exchanger 15 between the inlet 18 and the outlet 19. The one or more static inserts 20 are disposed between the first internal heat exchanger 13 and the second internal heat exchanger 15. The inlet 18 introduces a stream upward through a plurality of flow channels 14 of the first internal heat exchanger 13, through the static inserts 20, through a plurality of flow channels 16 of the second internal heat exchanger 15, and through the outlet 19. The stream may be a feed stream and/or a recirculating stream of solvent with or without a monomer, with or without one or more comonomers, and with or without a catalyst system. The flow paths 11 of the stream between the first internal heat exchanger 13 and the second internal heat exchanger 15 are rotated by the one or more static inserts 20. As shown in FIG. 2, the flow paths 11 may be along a length of the reactor (e.g., upward through a vertically oriented reactor 12). In other embodiments, the flow paths may be across another length of the reactor with an inlet introducing a stream downward or sideways (e.g., downward through a vertically oriented reactor or may be sideways through a horizontally oriented reactor).

In some embodiments, a single static insert 20 is used to span a portion or all of the outlets of the first internal heat exchanger 13. In some embodiments, a plurality of static inserts 20 is used to span a portion or all of the outlets of the first internal heat exchanger 13. Each of the plurality of static inserts may be the same or different in size, shape, and/or type.

The first internal heat exchanger 13 includes a heat exchange medium conduit 13M and includes an heat exchanger medium inlet 13I and a heat exchanger medium outlet 13O in fluid communication with the heat exchange medium conduit 13M. The second internal heat exchanger 15 includes a heat exchange medium conduit 15M and includes an heat exchanger medium inlet 15I and a heat exchanger medium outlet 15O in fluid communication with the heat exchange medium conduit 13M.

The heat exchange medium conduits 13M, 15M of the first and second internal heat exchangers 13, 15 span a segment of the reactor 12, such as an interior diameter of the reactor. A heat exchange medium is provided from the respective heat exchanger medium inlets 13I, 15I to the respective heat exchange medium conduits 13M, 15M and is removed by the respective heat exchanger medium outlets 13O, 15O. Each of the first and the second internal heat exchangers 13, 15 may be considered a separate reaction zone or stage. The monomer contacts the catalyst system in a reaction zone thereby forming polymer. A product stream comprising polymer product, unreacted monomer, and quenched or unquenched catalyst system exits the reactor 12 from outlet 19.

Figure 3:
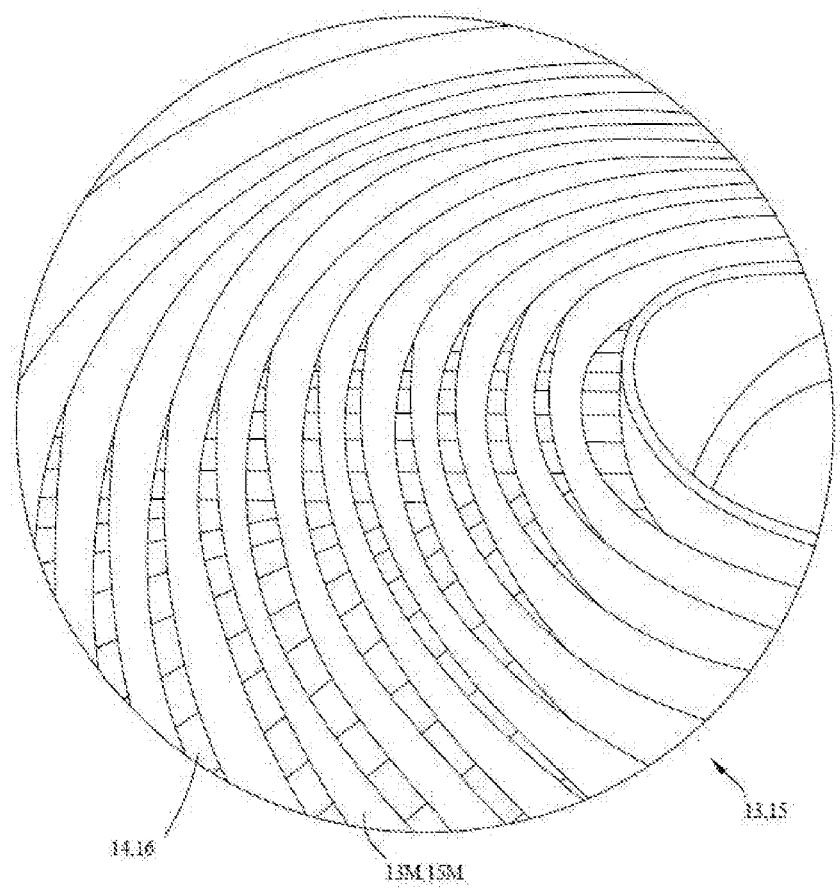
FIG. 3 is a schematic illustration of some embodiments of a top perspective view of an internal heat exchanger with a heat exchange medium conduit shaped as one or more spirals.

FIG. 3 is a schematic illustration of some embodiments of a top perspective view of one the first internal heat exchanger 13 or the second internal heat exchanger 15 of FIG. 2 with the heat exchange medium conduit 13M, 15M shaped as one or more spirals. For ease of description, one of the first internal heat exchanger 13 or the second internal heat exchanger 15 is referred to as internal heat exchanger 13, 15; one of the channels 14, 16 of the first internal heat exchanger 13 or the second internal heat exchanger 15 is referred to as flow channels 14, 16; and one of the heat exchange medium conduits 13M, 15M of the first internal heat exchanger 13 or the second internal heat exchanger 15 is referred to as heat exchange medium conduit 13M, 15M.

The spirals may be arranged radially around an axis that is symmetric or asymmetric with a central axis of the reactor 12 having a cylindrical body. The spirals of the internal heat exchanger 13, 15 may be any suitable spiral shape. Non-limiting examples of suitable internal heat exchangers with heat exchanger medium conduits shaped as a spiral include those described in U.S. Pat. Nos. 8,622,030; 8,075,845; 8,573,290; 7,640,972; 6,874,571; 6,644,391; 6,585,034; 4,679,621; and US publications 2010/0170665; 2010/0008833; 2002/0092646; 2004/0244968, each of which are incorporated herein by reference.

Flow paths of a stream through the flow channels 14, 16 of the internal heat exchanger 13, 15 is in a direction substantially orthogonal to a flow of a heat exchange medium through the heat exchange medium conduit 13M, 15M. Flows paths having directions that are substantially orthogonal include flow paths of a stream at an angle from about 700 to about 110°, such from about 80° to about 100°, such from about 85° to about 95°, such from about 88° to about 92° with respect to a flow of a heat exchange medium through the heat exchange medium conduit 13M, 15M of the internal heat exchanger 13, 15.

The internal heat exchanger 13, 15 may be oriented in a first direction where a stream flows in the first direction through the flow channels 14, 16 of the internal heat exchanger 13, 15 while the heat exchange medium flows through the heat exchanger medium conduit 13M, 15M in a second direction. In some embodiments, the orientation of the internal heat exchanger 13, 15 in a first direction can be oriented in any suitable direction so long as stream flows substantially orthogonal to a flow of a heat exchange medium through heat exchange medium conduit 13M, 15M of the internal heat exchanger 13, 15. For example, the internal exchanger 13, 15 may be oriented in a vertical direction where a stream flows in a vertical direction through the flow channels 14, 16 of the internal heat exchanger 13, 15. In another example, the internal exchanger 13, 15 may be oriented in a horizontal direction where a stream flows in a horizontal direction through the flow channels 14, 16 of the internal heat exchanger 13, 15.

Any suitable heat exchange medium may flow through the heat exchanger medium conduit 13M, 15M of the internal heat exchanger 13, 15. Particularly useful heat exchange media are those stable at the reaction temperatures. Examples of heat exchange media include, water, aqueous solutions, oil (e.g., hydrocarbons, such as mineral oil, kerosene, hexane, pentane, and the like), and synthetic media, such as those available from The Dow Chemical Company (Midland, Mich.) under the trade name DOWTHERM™, such as grades A, G, J, MX, Q, RP, and T, and those available from EASTMAN Chemical Company under the trade name Therminol™, such as grades 59, XP, etc. If water or other low boiling point fluids are used, then these may be under a suitable amount of pressure to prevent boiling. Alternately, if other low boiling point fluids such as propane, propylene, etc., or other synthetic refrigerants such as R12, R134a, etc., the pressure in the heat exchanger medium conduits is adjusted to match the desired boiling point temperature of the medium in relation to the reactor process fluid temperature. In at least one embodiment, the heat exchange medium flows through the heat exchange medium conduit 13M, 15M at a temperature lower than a temperature of a stream that flows through the flow channels 14, 16 of the internal heat exchanger to cool the stream. Additionally or alternatively, the heat exchange medium flows through the heat exchange medium conduit 13M, 15M at a temperature above a precipitation point of polymer product. For example, the heat exchange medium may flow through the heat exchange medium conduits 13M, 15M at a temperature of about 100° C. or more. If the reaction is endothermic, then a heat exchange medium may alternately be at a temperature higher than the stream and provide heat to the stream to enable the reaction to be conducted at an economically and/or technically feasible rate. In some embodiments, a percentage of the volume of the heat exchanger 13, 15 configured to be occupied by a process stream is from about 1% to about 99%, such as from about 20% to about 50%, based on the total allowable volume of the heat exchanger.

In some embodiments, the internal heat exchanger 13, 15 removes heat (e.g., produced during the polymerization reaction) from the process fluid volume at a rate from about 100 to about 5,000 Btu/hour cubic foot·° F., such as from about 550 to about 3,400 Btu/hour cubic foot·° F. In some embodiments, the internal heat exchanger 13, 15 removes heat (e.g., produced during the polymerization reaction) from the heat exchanger volume (including process fluid, the metal, and the utility) at a rate from about 50 to about 2,000 Btu/hour cubic foot·° F., such as from about 200 to about 1,400 Btu/hour cubic foot·° F.

In some embodiments, the internal heat exchanger 13, 15 provides a heat transfer coefficient (HTC) from about 1 to about 1,000 BTU/hr·° F.·ft$^2$, such as from about 10 to about 100 BTU/hr·° F.·ft$^2$. The HTC of the internal heat exchanger 13, 15 is defined by the following equations (1A-C):

$$Q = UA \frac{\Delta T_1 - \Delta T_2}{\ln(\Delta T_1 / \Delta T_2)} \quad (1A)$$

$$\Delta T_1 = T_{p,in} - T_{u,out} \quad (1B)$$

$$\Delta T_2 = T_{p,out} - T_{u,in} \quad (1C)$$

in which U is the heat transfer coefficient, p is the process, u is the utility, A is the heat transfer area, and Q is the heat flux across the walls of the heat exchanger. In some embodiments, the internal heat exchanger 13, 15 provides a Nusselt number from about 3.6 to about 10,000, such as from about 20 to about 750.

In some embodiments, the internal heat exchanger 13, 15 in the polymerization process is designed for and operated at a low pressure drop, which results in higher recirculation and production rates. For example, a pressure drop across the heat internal heat exchanger 13, 15 is about 20.0 psi or less, such as from about 0.01 psi to about 20.0 psi.

The polymerization processes with the reactor 12 of FIG. 2 with a first internal heat exchanger 13 and a second internal heat exchanger 15 may be conducted at a temperature from about 50° C. to about 220° C. The polymerization process may be conducted at a pressure from about 120 to about 1800 psi. The polymerization process may be conducted with a recycle ratio of zero to about 50. The polymer product may be produced at a rate of about 0.5 pounds or more per hour per gallon total reactor volume including the heat exchanger metal and utility for an individual internal heat exchanger.

The internal heat exchanger types of reactor can be used alone, in conjunction with one or more internal heat exchanger types of reactors, and/or in conjunction with other types of reactors such as a CFSTR, fluidized bed, loop, slurry and tubular reactor in a polymerization system. The reactors can be arranged in either series or parallel configurations. The polymerization system can also be used to produce in-reactor blends of olefin polymers or copolymers by various permutations and combinations of reactors connected in series and/or in parallel.

In some embodiments, a stream may be maintained substantially as a single liquid phase under polymerization conditions in a solution polymerization process. The viscosity of a stream is very high when making polymers using a solution polymerization process. The viscosity can vary widely, from about 0.01 to 10,000 centipoise, such as from about 0.01 to 5,000, such as from about 0.02 to 1000, such as from about 0.02 to 500 centipoise depending on the molecular weight of the polymer product, the concentration of the polymer product in the solution, the type of monomer and comonomer(s), and the temperature and pressure of the reactor.

Figure 4:
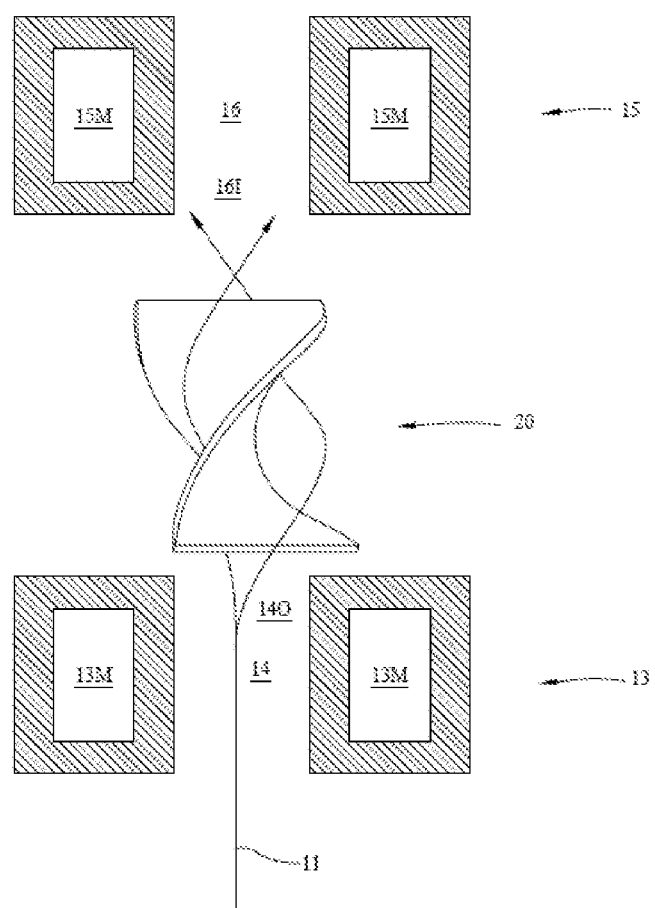
FIG. 4 is a schematic illustration of some embodiments of a static insert.

FIG. 4 is a schematic illustration of some embodiments of a static insert 20 of FIG. 2. The static insert 20 comprises one helix or multiple helices to rotate or translate a flow path so that on average the existing boundary layers are moved away from the channel walls by a distance of δ or greater. The thermal boundary layer here is defined as the fluid within a distance δ of the channel walls, where δ is defined by the following equations (2A) to (2J):

$$\delta = \frac{d_h}{Nu} \quad (2A)$$

$$d_h = \text{hydraulic diameter} \left(\frac{A}{P}\right) \quad (2B)$$

$$A = \text{cross-sectional area} \quad (2C)$$

$$P = \text{wetted perimeter} \quad (2D)$$

$$Nu = \text{Nusselt number} = \frac{h d_h}{k} \quad (2E)$$

$$h = \text{local heat transfer coefficient} = \frac{-k \partial T / \partial y |\_w}{T_w - T_m} \quad (2F)$$

$$\partial T / \partial y |\_w = \text{temperature gradient at the wall} \quad (2G)$$

$$T_w = \text{wall temperature} \quad (2H)$$

$$T_m = \text{Mass-flow-} \quad (2I)$$
weighted average fluid *temp* across width of the channel $$k = \text{thermal conductivity} \quad (2J)$$

The thermal boundary layer is defined in Bergman, Theodore L, et al. *Introduction to heat transfer*, John Wiley & Sons (2011), which is incorporated by reference in its entirety.

Figure 5:
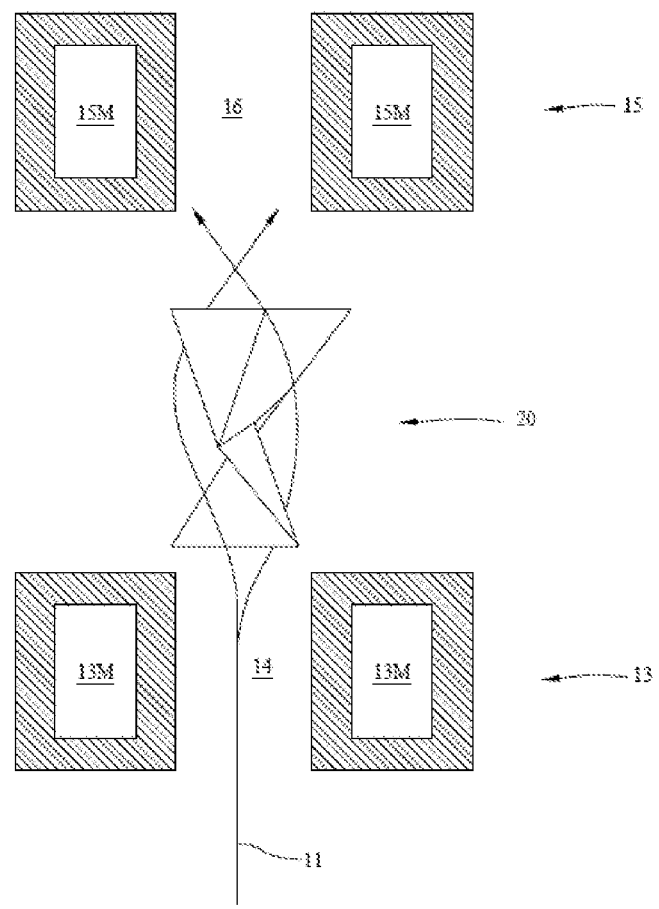
FIG. 5 is a schematic illustration of some another embodiments of a static insert.

The helix or helices can be any smooth curve or spiral. For example, a helix or helices can be a twisted baffle plate twisted 45° or more (i.e., a ⅛ turn or more), such as 90° or more (i.e., a ¼ turn or more). FIG. 5 is a schematic illustration of other embodiments of a static insert 20 of FIG. 2. The static insert 20 comprises multiple sections formed from a single plate or fabricated together from multiple plates to rotate or translate a flow path so that on average the existing boundary layers are moved away from the channel walls by a distance of δ or greater. For example, in some embodiments, a single plate is bent to include a plurality of flat sections and/or curved sections to rotate or translate a flow path so that on average, the existing boundary layers are moved away from the channel walls by a distance of δ or greater. For example, in some embodiments, multiple plates are coupled, welded, or attached together to form a plurality of flat sections and/or curved sections to rotate or translate a flow path so that on average, the existing boundary layers are moved away from the channel walls by a distance of δ or greater. In the embodiment shown in FIG. 5, the static insert 20 comprises six triangular flat sections to rotate or translate a flow path so that on average, the existing boundary layers are moved away from the channel walls by a distance of δ or greater. In other embodiments, the static insert 20 comprises at least two or more flat sections. The flat sections may be any polygonal shape and may be the same or different in size or shape.

The static insert 20 of FIG. 4 or FIG. 5 is proximate one or more outlets of the flow channels 14 of the first internal heat exchanger 13. The static insert 20 rotates or translates a flow path so that on average, the existing boundary layers are moved away from the channel walls by a distance of δ or greater. The static insert 20 disrupts the flow pattern and extends the entrance zone in the subsequent internal heat exchanger before the formation of fully developed boundary layers by preventing the flow path 11 from directly exiting an outlet 14O of the flow channel 14 of the first internal heat exchanger 13 and entering an inlet 16I of the flow channel 16 of the second internal heat exchanger 15 at the same distance relative to the channel walls. Boundary layers are reduced between the first internal heat exchanger 13 and the second internal heat exchanger 15, at the interior walls of the reactor 12, and/or within the flow channel 16 of the second heat exchanger 15. For example, a flow path 11 proximate an inner wall of the reactor 12 is rotated by 45° or more, such as 90° or more, and delays the development of a boundary layer at the inner wall. In another example, a flow path 11 continues to rotate at least partially in a flow channel 16 of the second heat exchanger 15 and delays the development of a boundary layer within the flow channel. The heat transfer rates of reactor 12 with one or more static inserts 20 between the first and the second internal heat exchanger 13, 15 are higher in comparison to a reactor with a static insert which does not rotate the flow path or which rotates the flow path less than 45°.

A static insert provides a more gentle transformation of a flow of a stream in comparison to a static mixer. In comparison, if a static mixer is used instead of a static insert, the static mixer produces wakes, dead zones, local eddies, and/or a turbulent flow of the stream. Therefore, a static mixer in comparison to the present static insert undesirably produces a larger change in pressure with increased energy consumption of the reactor and increased capital cost of equipment.

In some embodiments, the static insert 20 is designed such that it does not foul as easily. For example, continuous flow of a stream across both surfaces of the twisted baffle plate of the static insert 20 scrubs or scours any deposits or sludge from the surfaces of the twisted baffle plate.

In certain embodiments, a flow of a stream through or along the static insert 20 may be creeping, laminar, or near-laminar flow. In some embodiments, the static insert 20 produces a minimal amount of wakes, dead zones, or local eddies. Such wakes, dead zones, or local eddies would undesirably form hot spots in the stream. Wakes, dead zones, or local eddies can undesirably form from certain static mixer geometries, such as a single section baffle plate. These zones would have a long residence time and increase fouling in the insert.

In other embodiments, the static insert 20 of FIG. 4 or FIG. 5 may include two or more static inserts stacked on top of each other between an outlet 14O of a flow channel 14 of the first internal heat exchanger 13 and an inlet 16I of a flow channel 16 of the second internal heat exchanger 15.

Figure 6:
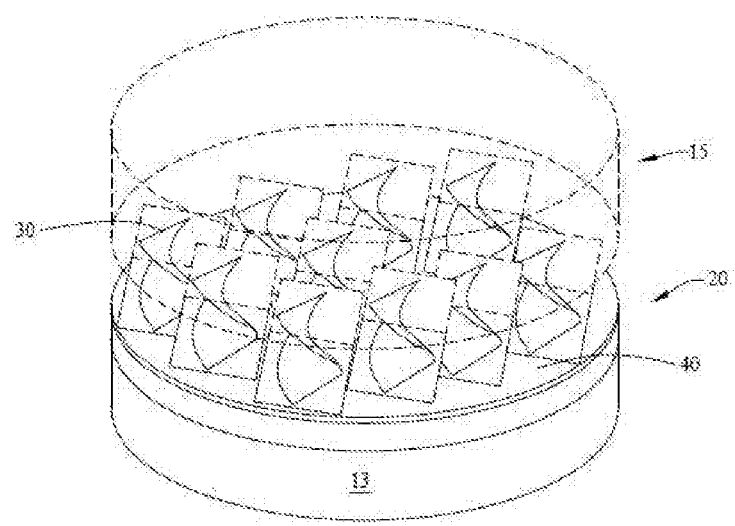
FIG. 6 is a schematic illustration of some embodiments of a plurality of static inserts positioned between the first internal heat exchanger and the second internal heat exchanger.

FIG. 6 is a schematic illustration of some embodiments of a plurality of static inserts 20 positioned between the first internal heat exchanger 13 and the second internal heat exchanger 15. The static inserts 20, which rotate the flow paths, may be helical in shape as described in reference to FIG. 4 or non-helical in shape as described in reference to 5. In some embodiments, the static inserts 20 are disposed in a housing 30, such as a cylindrical housing or a rectangular housing. In the case of a cylindrical housing, the housing 30 comprises a cylindrical sidewall with an open top and bottom for a flow path through the housing. In the case of a rectangular housing, the housing 30 comprises four sidewalls with an open top and bottom for a flow path through the housing. As shown in FIG. 6, the plurality of static inserts 20 is disposed on a support structure 40, such as a grid having holes to permit flow of a stream through the holes of the grid. In other embodiments, the static inserts 20 are disposed directly on the first internal heat exchangers 13. In other embodiments, each static inserts 20 can include individual support structures. The static inserts can be arranged to form one layer or one slab of static inserts covering a surface of a heat exchanger or can be stacked to form two or more layers or two or more slabs of static inserts covering a surface of a heat exchanger.

In other embodiments, one or more static inserts may be used to rotate a flow path in other heat exchangers, such as in a shell and tube heat exchanger. In other embodiments, one or more static insert may be used to improve the efficiency of a heat exchanger to reduce the growth of boundary layers in the flow paths in which no reactions are occurring in the heat exchangers.

In some embodiments, the reactor (such as reactor 12 of FIG. 2) comprises a suitable containment structure to contain a plurality of internal heat exchangers (e.g., a first internal heat exchanger 13, a second internal heat exchanger 15, etc.) defining flow paths of one or more streams. In some embodiments, the reactor comprises one or more loop reactors (LRs) with recirculation of a portion of the polymer product stream back to an inlet of the reactor. In some embodiments, the reactor comprises one or more loop once-through reactors with no such recirculation.

Figure 7:
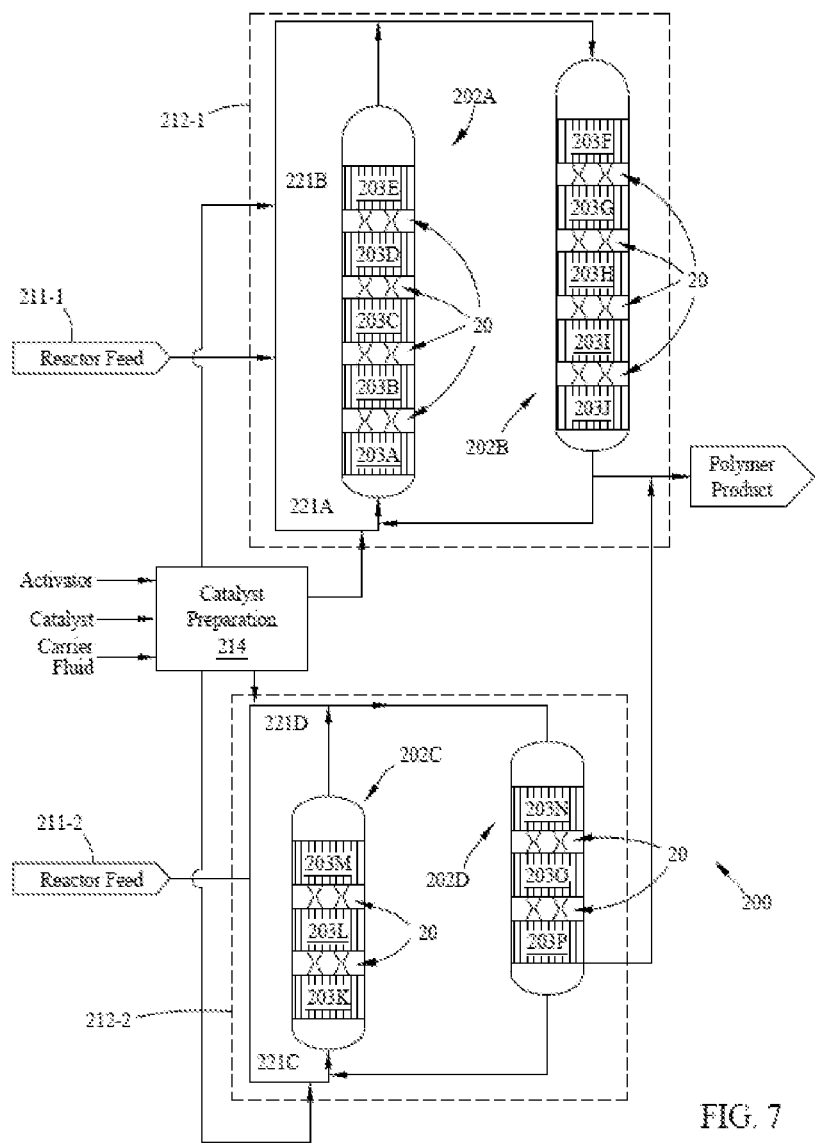
FIG. 7 is a schematic diagram of some embodiments of a polymerization system utilizing a reactor.

FIG. 7 is a schematic diagram of some embodiments of a polymerization system 200 utilizing a reactor. Single reactors, reactors in series or parallel configurations, and/or multiple types of reactors may be used to conduct the polymerization reaction economically to achieve desired polymer properties, monomer conversions, and production rates.

The system 200 includes one or more reactors 202A-D. Each reactor 202A-D includes one or more internal heat exchangers 203A-P. Each internal heat exchanger 203A-P can be any size, such as any length, any width, any number and size of heat exchange medium flow channels, or any number of heat exchanger apertures. One or more static inserts 20 may be between heat exchangers 203A-203B, between heat exchangers 203B-203C, between heat exchangers 203C-203D, between heat exchangers 203D-203E, between heat exchangers 203F-203G, between heat exchangers 203G-203H, between heat exchangers 203H-203I, between heat exchangers 203I-203J, between heat exchangers 203K-203L, between heat exchangers 203L-203M, between heat exchangers 203N-203O, and/or between heat exchangers 203O-203P. The static inserts 20 may be the static inserts as described in reference to FIGS. 2-6. The number, type, and size of static inserts 20 between each heat exchangers 203A-P may be the same or different.

Reactor 202A and 202B are coupled together to form a first loop reactor 212-1 with reactor 202A being a segment flowing in a first direction and with reactor 202B being a segment flowing in a second direction (such as a direction substantially opposite the first direction). A portion of the stream exiting reactor 202B may be recycled back to reactor 202A. Reactor 202C and 202D are coupled together to form a second loop reactor 212-2 with reactor 202C being a segment flowing in a third direction (which may be substantially the same as the first direction) and with reactor 202D being a segment flowing in a fourth direction (which may be substantially the same as the second direction and/or may be a direction substantially opposite the third direction). A portion of the stream exiting reactor 202D may be recycled back to reactor 202C. The number of segments of each loop reactor may vary. The loop reactors may be arranged vertically or horizontally with forward and reverse flowing segments.

The loop reactors 212-1 and 212-2 are arranged in parallel such that the product from the one loop reactor does not enter the other loop reactor. In other embodiments, the loop reactors may be arranged in series where all or a portion of the polymer product from one loop reactor flows through another loop reactor. The number of loop reactors may vary. The feed locations for reactor feeds and catalyst and activators may vary. For example, a feed stream can be located between the heat exchangers of a reactor in which the combined stream is rotated 45° or more, such as 90° or more, by a static insert.

In some embodiments, the polymerization system, such as the system 200 of FIG. 7 or any other suitable system, may include an internal heat exchanger, such as an internal heat exchanger described in reference to FIGS. 2-6, configured to be operated with a mean residence time of a single pass of a stream from about 0.3 seconds to about 1,000,000 seconds, such as from about 3 seconds to about 15 seconds. In some embodiments, the polymerization system may include a reactor, such as a reactor described in reference to FIG. 2 or any other suitable reactor, configured to be operated with a mean residence time of a single pass of a stream from about 3 seconds to about 1,000,000 seconds, such as from about 30 seconds to about 90 seconds. In some embodiments, the polymerization system may include a loop reactor, such as a loop reactor including two reactors plus the connecting pipes described in reference to FIG. 8 or any other suitable loop reactor, configured to be operated with a mean residence time of a single pass of a stream from about 10 seconds to about 1,000,000 seconds, such as from about 100 seconds to about 300 seconds. In some embodiments, the polymerization system may include a loop reactor, such as a loop reactor including two reactors plus the connecting pipes described in reference to FIG. 7 or any other suitable loop reactor, configured to be operated with a mean residence time of overall multiple passes to exit of a stream from about 100 seconds to about 10,000,000 seconds, such as from about 800 seconds to about 6,000 seconds.

The system 200 of FIG. 7 can be used for polymerization of any suitable monomers. The system 200 includes one or more reactor feeds 211. The reactor feed 211 provides a feed stream including one or more monomers, such as substituted or unsubstituted $C_2$ to $C_{40}$ olefins (such as $C_2$ to $C_{40}$ alpha-olefins). The monomers are provided in feed streams at proportions suitable for making the corresponding desired homopolymer or co-polymer. Examples of substituted or unsubstituted $C_2$ to $C_{40}$ olefins include ethylene, propylene, butene, pentene, hexene, heptene, octene, nonene, decene, undecene, dodecene, norbornene, cyclopentene, cycloheptene, cyclooctene, cyclododecene, oxanorbornene, substituted derivatives thereof, isomers thereof, homologs thereof, and mixtures thereof.

In some embodiments, the feed stream includes one or more diolefin monomers. Examples of diolefin monomers include propadiene, butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, cyclopentadiene, 5-vinyl-2-norbornene, norbornadiene, 5-ethylidene-2-norbornene, divinylbenzene, dicyclopentadiene, and mixtures thereof. In some embodiments, diolefin monomers are incorporated in the polymer chain at up to 20 wt %, such as at 0.00001 wt % to 10.0 wt %.

Reactor feed stream 211 may provide a feed stream comprising a solvent. The feed stream may be cooled or may be heated depending on the desired reaction kinetics. In some embodiments, a solvent may be present during the polymerization process. Examples of solvents for polymerization include non-coordinating, inert liquids. Examples of non-coordinating, inert liquids include straight, branched-chain, cyclic, alicyclic, halogenated, or aromatic hydrocarbons and mixtures thereof. Examples of straight and branched-chain hydrocarbons include isobutane, butane, pentane, isopentane, hexane, isohexane, heptane, octane, dodecane, and mixtures thereof such as ISOPAR E from ExxonMobil of Houston, Tex. Examples of cyclic and alicyclic hydrocarbons include cyclohexane, cycloheptane, methylcyclohexane, methylcycloheptane, and mixtures thereof. Examples of halogenated hydrocarbons include fluorinated $C_4$-$C_{10}$ alkanes and chlorobenzene. Examples of aromatic compounds include benzene, toluene, mesitylene, and xylene. In some embodiments, the feed stream includes solvent for the polymerization of 40 vol % or more, such as 60 vol % or more, such as 80 vol % or more, such as 95 volume % or more, based on the total volume of the feed stream. In other embodiments, the monomers and/or comonomers act as the diluent/solvent of the polymerization reaction.

A polymerization process for forming polymer includes contacting a monomer, an optional comonomer, and a catalyst system in a reaction zone including at least one internal heat exchanger, such as a spiral heat exchanger, and recovering polymer. The polymerization process includes any exothermic reaction in which heat is removed by the at least one internal heat exchanger. In some embodiments, the polymerization processes is carried out in a liquid phase process, such as solution, suspension, slurry, bulk, or emulsion polymerization processes. In some embodiments, the polymerization process is a solution polymerization process. In some embodiments, the polymerization processes is carried out in a gas phase process. The polymerization processes can be run in a batch, semi-batch, or continuous mode. In some embodiments, the polymerization process is continuous.

In some embodiments, the polymerization process is a solution phase process. In a solution polymerization process, the monomer, the optional comonomer, and catalyst system are contacted in a solution phase and polymer is obtained. In some embodiments, the solution phase process is run with solvent. In some embodiments, the solution phase process is run in a bulk process where one of the monomers also acts as diluent or solvent without need for any chemically different additional solvent(s).

In some embodiments, the polymerization process is a slurry process. A slurry polymerization process generally operates between 1 to about 150 atmosphere pressure range (15 psi to 2205 psi, 103 kPa to 15450 kPa) or even greater and temperatures in a range of 0° C. to about 250° C., such as within a range of about 30° C. to about 220° C. In a slurry polymerization, a suspension of solid, particulate polymer is formed in a liquid polymerization diluent medium to which monomer and comonomer, along with catalyst, are added. The suspension, including diluent, is intermittently or continuously removed from the reactor where the volatile components are separated from the polymer and recycled, optionally after a distillation, to the reactor. The liquid diluent employed in the polymerization medium is typically an alkane having from 3 to 7 carbon atoms. The medium employed should be liquid under the conditions of polymerization and relatively inert. A slurry process is also described, for instance, in U.S. Pat. No. 3,248,179; which is incorporated herein by reference.

Any suitable polymerization catalyst, for example a Ziegler-Natta catalyst system, chromium catalysts, metallocene catalyst system, pyridyldiamide catalyst or other single site catalysts, or a combination thereof including a bimetallic (i.e., Z/N and/or metallocene) catalyst, can be used in the internal heat exchange reactor, such the spiral heat exchange reactor. The catalyst (e.g., olefin polymerization catalyst compound, such as metallocene compound, pyridyldiamido compound, etc.) and activator may be combined in any order. For example, the catalyst (e.g., olefin polymerization catalyst compound, such as metallocene compound, pyridyldiamido compound, etc.) and the activator may be combined prior to contacting the monomer. Alternatively, the activator may be added to a solution of the monomer and the catalyst (e.g., olefin polymerization catalyst compound, such as metallocene compound, pyridyldiamido compound, etc.). In some embodiments, the activator and catalyst (e.g., olefin polymerization catalyst compound, such as metallocene compound, pyridyldiamido compound, etc.) are contacted to form the catalyst system prior to entering the at least one internal heat exchanger, such as a spiral heat exchanger.

The catalyst system may further comprise a support. Typical support may be any support such as talc, an inorganic oxide, clay, and clay minerals, ion-exchanged layered compounds, diatomaceous earth, silicates, zeolites or a resinous support material such as a polyolefin.

The catalyst system may be dried and introduced into the internal heat exchanger, such as the spiral heat exchanger, as a solid (such as a powder), suspended in mineral oil and introduced as a mineral oil slurry, combined with typical hydrocarbon solvent material (such as hexane, isopentane, etc.) and introduced as a suspension, or any other means.

Reactor feed 211-1 provides one or more feed sub-streams 221A-B to the loop reactor 212-1 to introduce a feed stream at one or more points along the segments of the loop reactor 212-1. The flow rates of each of feed sub-streams 221A-B of the reactor feed 211-1 may be set to a desired level. For example, the flow rates of one or more feed streams 221A-B to the loop reactor 212-1 are selected to tailor the molecular weight distribution and composition distribution along the growing polymer chains. For instance, additional monomer or monomers may be introduced at one or more points along the segments of the loop reactor 212-1 to obtain the desired composition distribution of the various monomers used in the polymerization.

Reactor feed 211-2 provides one or more feed sub-streams 221C-D to the loop reactor 212-2 to introduce a feed stream at one or more points along the segments of the loop reactor 212-2. The flow rates of each of feed sub-streams 221C-D of the reactor feed 211-2 may be set to a desired level. For example, the flow rates of the feed sub-streams 221C-D of reactor feed 211-2 may be set to the same, similar, or different level to the flow rates of the feed sub-streams 221A-B of the reactor feed 211-1 to produce the same, similar, or different polymer product.

The flow rates from the catalyst preparation 214 provide activator species and catalyst species to one or more points along the segments of each loop reactor. For example, a feed sub-stream of activator species and catalyst species may be provided between heat exchangers of reactors 202A-D. The number of feed sub-streams of activator species and catalyst species are set to obtain a desired temperature distribution in the loop reactor 212 and to provide a certain level of catalyst efficiency.

In each loop reactor 212, the feed stream is introduced at one or more suitable points in the loop and the polymer product is withdrawn at another suitable point from the recirculating flow. The ratio by mass of total recirculating flow to fresh feed flow is typically in the range of 0 to 50. For example, the ratio by mass of total recirculating flow to fresh feed flow can be varied from 0 (to mimic the performance of a tubular once-through reactor) to 15 and above (to mimic the performance of a CFSTR). The circulation ratio may also be expressed as the ratio of total mass circulating in the loop divided by the mass flow rate of the effluent stream leaving the reactor loop.

Reactants, solvents, catalysts, scavengers, modifiers, other feedstock, polymer product, feed stream, and/or recirculating stream (collectively referred to as "stream") flow through the each loop reactor 212-1 and 212-2 at a specified rate to obtain a desired polymer product. The characteristics of the polymer product (such as composition, molecular weight, and tacticity) depend in part on a temperature of the stream. Small temperature differences at the reactor wall between the internal heat exchangers and/or within the flow channels of an internal heat exchanger of the reactor provide a polymer product with a different distribution of properties. A wide distribution of polymer properties results in differences in processability and performance in the final application of the polymer. Reducing the variability in local temperature at the reactor wall between the internal heat exchangers and/or within the flow channels of an internal heat exchanger of the reactor enables producing a repeatable polymer product with desired properties. In some embodiments, one or more static inserts are used between the internal heat exchanger to reduce growth of boundary layers and to reduce the variability in local temperature in the reactor.

Embodiments Listing

The present invention provides, among others, the following embodiments, each of which may be considered as optionally including any alternate embodiments.

Clause 1. A reactor, comprising;
   a reactor body;
   a first internal heat exchanger and a second internal heat exchanger disposed within the reactor body; and
   one or more slabs of one or more static inserts disposed between the first internal heat exchanger and the second internal heat exchanger, each static insert configured to rotate a flow path between the first internal heat exchanger and the second internal heat exchanger.

Clause 2. The reactor of Clause 1, wherein each of the one or more static inserts comprises a twisted baffle plate.

Clause 3. The reactor of Clauses 1 or 2, wherein each of the one or more static inserts comprises a plurality of flat sections.

Clause 4. The reactor of any of Clauses 1 to 3, further comprising a housing disposed around each of the one or more static inserts.

Clause 5. The reactor of any of Clauses 1 to 4, wherein the housing is a cylindrical housing.

Clause 6. The reactor of any of Clauses 1 to 5, wherein the housing is a rectangular housing.

Clause 7. The reactor of any of Clauses 1 to 6, further comprising a support structure disposed between the first internal heat exchanger and the second internal heat exchanger, the one or more static inserts disposed on the support structure.

Clause 8. The reactor of any of Clauses 1 to 7, wherein the first internal heat exchanger and the second internal heat exchanger are spiral internal heat exchangers.

Clause 9. A reactor, comprising;
   a reactor body;
   a first internal heat exchanger disposed within the reactor body, the first internal heat exchanger having a plurality of flow channels;
   a second internal heat exchanger disposed within the reactor body, the second internal heat exchanger having a plurality of flow channels; and
   one or more slabs of a plurality of static inserts disposed between the first internal heat exchanger and the second internal heat exchanger, the plurality of static inserts configured to rotate or translate the plurality of flow paths so that on average, the existing boundary layers are moved away from the channel walls by a distance of $\delta$ or greater Clause 10. The reactor of Clause 9, wherein each of the plurality of static inserts comprises a twisted baffle plate.

Clause 11. The reactor of Clauses 9 or 10, wherein each of the plurality of static inserts comprises a plurality of flat sections.

Clause 12. The reactor of any of Clauses 9 to 11, further comprising a housing disposed around the plurality of static inserts.

Clause 13. The reactor of any of Clauses 9 to 12, wherein the housing is a cylindrical housing.

Clause 14. The reactor of any of Clauses 9 to 13, wherein the housing is a rectangular housing.

Clause 15. The reactor of any of Clauses 9 to 14, further comprising a support structure disposed between the first internal heat exchanger and the second internal heat exchanger, the plurality of static inserts disposed on the support structure.

Clause 16. The reactor of any of Clauses 9 to 15, wherein the first internal heat exchanger and the second internal heat exchanger are spiral internal heat exchangers.

Clause 17. A polymerization process for forming polymer, comprising:
   flowing a stream comprising a monomer and a catalyst through a first internal heat exchanger in a reactor;
   rotating the stream by flow the stream through one or more slabs of one or more static inserts in the reactor; and
   flowing the stream through a second internal heat exchanger in the reactor.

Clause 18. The polymerization process of Clause 17, wherein the one or more static inserts rotates or translates one or more flow paths of the stream between the first internal heat exchanger and the second internal heat exchanger so that on average, the existing boundary layers are moved away from the channel walls by a distance of 6 or greater Clause 19. The polymerization process of Clauses 17 or 18, wherein the one or more flow paths of the stream are proximate an inner wall of the reactor.

Clause 20. The polymerization process of any of Clauses 17 to 19, wherein the one or more flow paths continue to rotate at least partially within the one or more flow channels of the second internal heat exchanger.

Clause 21. The polymerization process of any of Clauses 17 to 20, wherein the first internal heat exchanger and the second internal heat exchanger are spiral internal heat exchangers.

Clause 22. The polymerization process of any of Clauses 17 to 21, wherein flowing the stream through one or more static inserts increases a heat transfer coefficient of the second internal heat exchanger by 1 BTU/hr·° F.·ft² or more as compared to if the stream were directly flowed from the first internal heat exchanger to the second internal heat exchanger.

Clause 23. The polymerization process of any of Clauses 17 to 22, wherein the stream is a feed stream or a recirculating stream.

Clause 24. The polymerization process of any of Clauses 17 to 23, wherein the one or more static inserts is placed in a creeping, near laminar or laminar flow of the flow paths.

EXAMPLES

Example 1

Figure 8:
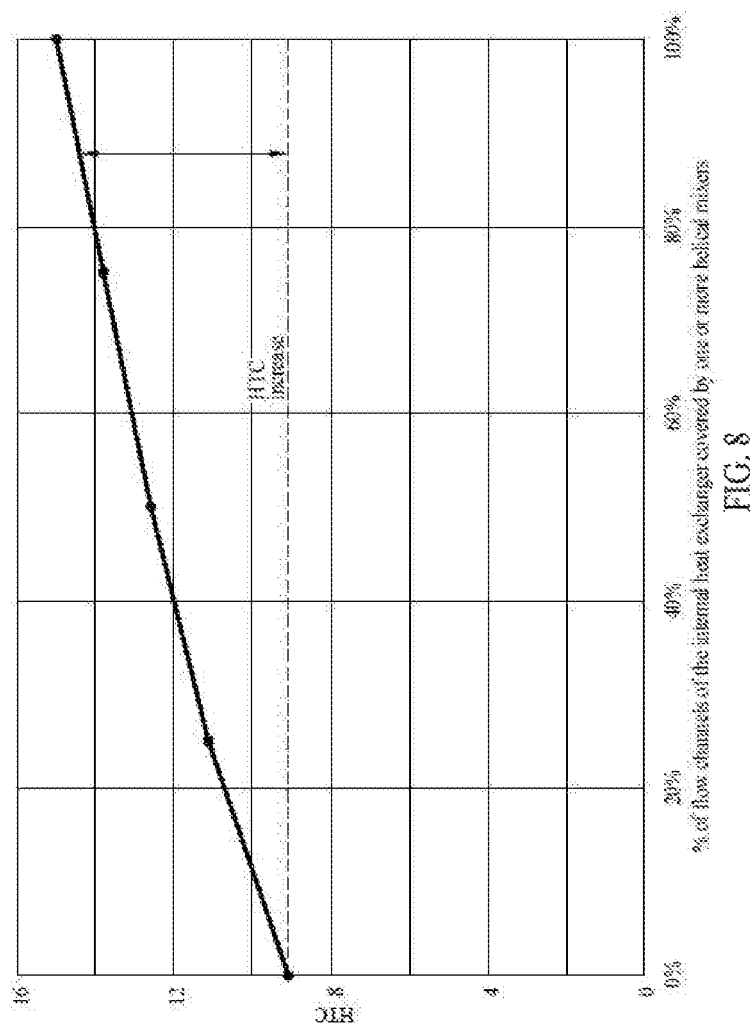
FIG. 8 is a chart of some embodiments of a heat transfer coefficient of a second spiral internal heat exchanger.

Heat transfer coefficients between a flow of a stream from the entrance and the exit of five internal heat exchangers in series was modeled. Between each of the internal heat exchangers, the percentage of inlets of the flow channel covered by a static insert ranged from 0% coverage (i.e., no static inserts) up to 100% coverage. The heat transfer coefficients were modeled using a Martin Correlation with k=0.095 W/m/K. The Martin Correlation was determined from Nickolay, Markus, and Holger Martin, "Improved approximation for the Nusselt number for hydrodynamically developed laminar flow between parallel plates." *International journal of heat and mass transfer* 45(15): 3263-3266 (July 2002), which is incorporated by reference in its entirety. The internal heat exchangers were similar to the internal heat exchangers 13, 15 as described in FIGS. 2-6. The flow was through or along zero to a plurality of static inserts similar to the static insert 20 of FIGS. 2 and 4-6. The heat transfer coefficients at the exit of the five internal heat exchangers in series were plotted on a chart as shown in FIG. 8. As the percentage of flow channels of the internal heat exchangers are covered by one or more static inserts, the heat transfer coefficient increases. Use of one or more static inserts increases the heat transfer coefficient by about 1 BTU/hr·° F.·ft² or more, such at about 3 BTU/hr·° F.·ft² or more, as compared to if the stream were directly flowed between the internal heat exchangers without any static inserts.

Example 2

Figure 9:
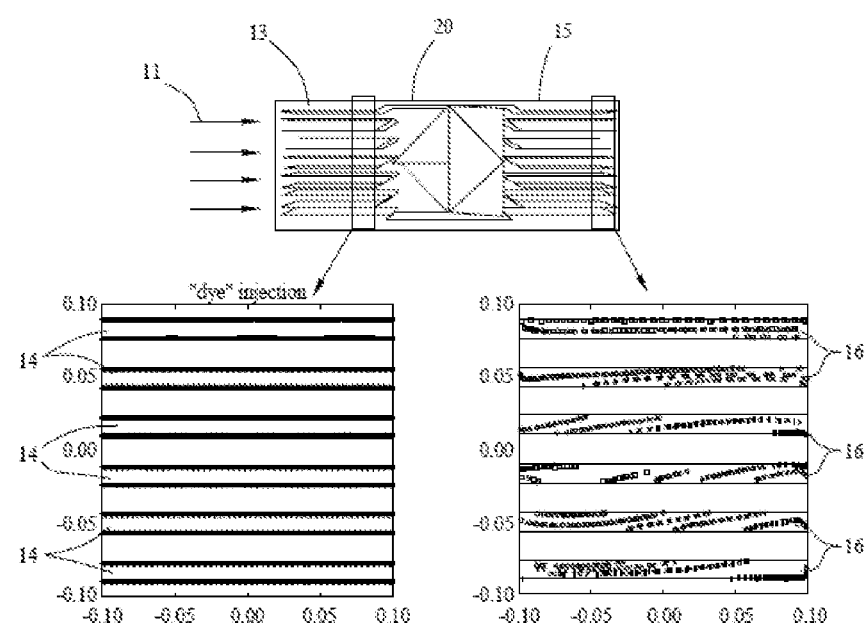
FIG. 9 is a schematic diagram illustrating modeled flow paths with static inserts, according to some embodiments, and without static inserts.

The flow paths 11 of a stream were modeled utilizing the internal heat exchangers 13, 15 of FIG. 2 with the static insert 20 of FIG. 5. FIG. 9 shows the flow paths 11 through the channels 14 of the first internal heat exchanger 13 without rotation and the flow paths 11 through the channels 16 of the second internal exchanger 15 with rotation caused by the static insert 20. The flow paths 11 are in laminar flow rotated by the static insert 20 between the internal heat exchangers 13, 15 with planar flow channels. The flow paths at the top of the internal heat exchangers 13, 15 are proximate an internal wall of the reactor and the flow paths at the bottom of the internal heat exchangers 13, 15 are proximate a center of the reactor. As shown in FIG. 9, the static insert 20 provides rotation of the flow paths 11 with increased heat transfer in comparison to no static insert and reduce fouling in comparison to static mixers.

All documents described herein are incorporated by reference herein, including any priority documents and/or testing procedures to the extent they are not inconsistent with this text. As is apparent from the foregoing general description and the specific embodiments, while forms of the embodiments have been illustrated and described, various modifications can be made without departing from the spirit and scope of the present disclosure. Accordingly, it is not intended that the present disclosure be limited thereby. Likewise, the term "comprising" is considered synonymous with the term "including." Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "I" preceding the recitation of the composition, element, or elements and vice versa, e.g., the terms "comprising," "consisting essentially of," "consisting of" also include the product of the combinations of elements listed after the term.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All priority documents are herein fully incorporated by reference for all jurisdictions in which such incorporation is permitted and to the extent such disclosure is consistent with the description of the present disclosure. Further, all documents and references cited herein, including testing procedures, publications, patents, journal articles, etc. are herein fully incorporated by reference for all jurisdictions in which such incorporation is permitted and to the extent such disclosure is consistent with the description of the present disclosure.

While the present disclosure has been described with respect to a number of embodiments and examples, those skilled in the art, having benefit of the present disclosure, will appreciate that other embodiments can be devised which do not depart from the scope and spirit of the present disclosure as described herein.

We claim:

1. A reactor, comprising:
a reactor body;
a first internal heat exchanger and a second internal heat exchanger disposed within the reactor body; and
one or more slabs of one or more static inserts disposed between the first internal heat exchanger and the second internal heat exchanger within the reactor body, each static insert configured to rotate a flow path between the first internal heat exchanger and the second internal heat exchanger.

2. The reactor of claim 1, wherein each of the one or more static inserts comprises a twisted baffle plate.

3. The reactor of claim 1, wherein each of the one or more static inserts comprises a plurality of flat sections.

4. The reactor of claim 1, further comprising a housing disposed around each of the one or static inserts.

5. The reactor of claim 1, wherein the housing is a cylindrical housing or a rectangular housing.

6. The reactor of claim 1, further comprising a support structure disposed between the first internal heat exchanger and the second internal heat exchanger, the one or more static inserts disposed on the support structure.

7. The reactor of claim 1, wherein the first internal heat exchanger and the second internal heat exchanger are spiral internal heat exchangers.

8. The reactor of claim 1, comprising a plurality of slabs that each comprise a plurality of static inserts, wherein each of the plurality of static inserts comprises at least one helix configured to rotate the flow path.

9. The reactor of claim 1, wherein the reactor body defines an internal volume, wherein the first internal heat exchanger comprises a first set of heat exchange medium conduits in fluid contact with the internal volume of the reactor body, wherein the second internal heat exchanger comprises a second set of heat exchange medium conduits in fluid contact with the internal volume of the reactor body, and wherein the one or more slabs of the one or more static inserts are in fluid contact with the internal volume of the reactor body.

10. A reactor, comprising:
a reactor body;
a first internal heat exchanger disposed within the reactor body, the first internal heat exchanger having a plurality of flow channels;
a second internal heat exchanger disposed within the reactor body, the second internal heat exchanger having a plurality of flow channels; and
a plurality of flow paths defined between the plurality of flow channels of the first internal heat exchanger and the plurality of flow channels of the second internal heat exchanger; and
one or more slabs of a plurality of static inserts disposed between the first internal heat exchanger and the second internal heat exchanger within the reactor body, the plurality of static inserts is configured to rotate or translate the plurality of flow paths so that on average, the existing boundary layers are moved away from the channel walls by a distance of δ or greater.

11. The reactor of claim 10, wherein each of the plurality of static inserts comprises a twisted baffle plate.

12. The reactor of claim 10, wherein each of the plurality of static inserts comprises a plurality of flat sections.

13. The reactor of claim 10, further comprising a housing disposed around each of the plurality of static inserts.

14. The reactor of claim 10, wherein the housing is a cylindrical housing or a rectangular housing.

15. The reactor of claim 10, further comprising a support structure disposed between the first internal heat exchanger and the second internal heat exchanger, the plurality of static inserts disposed on the support structure.

16. The reactor of claim 10, wherein the first internal heat exchanger and the second internal heat exchanger are spiral internal heat exchangers.

17. A polymerization process for forming polymer, comprising:
   flowing a stream comprising a monomer and a catalyst through a first internal heat exchanger in a reactor, the reactor comprising:
      a reactor body;
      a first internal heat exchanger and a second internal heat exchanger disposed within the reactor body; and
      one or more slabs of one or more static inserts disposed between the first internal heat exchanger and the second internal heat exchanger within the reactor body, each static insert configured to rotate a flow path between the first internal heat exchanger and the second internal heat exchanger;
   rotating the stream by flowing the stream through the one or more slabs of the one or more static inserts in the reactor; and
   flowing the stream through the second internal heat exchanger in the reactor.

18. The polymerization process of claim 17, wherein the one or more static inserts rotates one or more flow paths of the stream between the first internal heat exchanger and the second internal heat exchanger by 45° or more.

19. The polymerization process of claim 18, wherein the one or more flow paths of the stream are proximate an inner wall of the reactor.

20. The polymerization process of claim 18, wherein the one or more flow paths continue to rotate at least partially within one or more flow channels of the second internal heat exchanger.

21. The polymerization process of claim 17, wherein the first internal heat exchanger and the second internal heat exchanger are spiral internal heat exchangers.

22. The polymerization process of claim 17, wherein flowing the stream through one or more static inserts increases a heat transfer coefficient of the second internal heat exchanger by 1 BTU/hr·° F.·ft$^2$ or more as compared to if the stream were directly flowed from the first internal heat exchanger to the second internal heat exchanger.

23. The polymerization process of claim 17, wherein the stream is a feed stream or a recirculating stream.

24. The polymerization process of claim 18, wherein the one or more static inserts produces a creeping, near laminar or laminar flow of the flow paths.

* * * * *